(12) United States Patent
Steurer et al.

(10) Patent No.: US 8,572,962 B2
(45) Date of Patent: Nov. 5, 2013

(54) EXHAUST GAS RECIRCULATION SYSTEM

(75) Inventors: Hans-Ulrich Steurer, Stuttgart (DE);
Eberhard Pantow, Winnenden (DE);
Jérôme Genoist, Plaisir (FR)

(73) Assignees: Behr GmbH & Co. KG, Stuttgart (DE);
Behr France Rouffach SAS, Rouffach (FR)

( * ) Notice: Subject to any disclaimer, the term of this patent is extended or adjusted under 35 U.S.C. 154(b) by 487 days.

(21) Appl. No.: 12/891,396

(22) Filed: Sep. 27, 2010

(65) Prior Publication Data
US 2011/0072808 A1 Mar. 31, 2011

(30) Foreign Application Priority Data
Sep. 25, 2009 (EP) .................................... 09290726

(51) Int. Cl.
*F02B 33/44* (2006.01)
(52) U.S. Cl.
USPC ............................. 60/605.2; 60/602; 60/604
(58) Field of Classification Search
USPC ........................ 60/605.2, 602, 604
See application file for complete search history.

(56) References Cited

U.S. PATENT DOCUMENTS

| | | | |
|---|---|---|---|
| 5,927,075 A * | 7/1999 | Khair | 60/605.2 |
| 6,155,042 A | 12/2000 | Perset et al. | |
| 7,043,914 B2 * | 5/2006 | Ishikawa | 60/605.2 |
| 8,297,049 B2 * | 10/2012 | Ohtani | 60/317 |

FOREIGN PATENT DOCUMENTS

| | | |
|---|---|---|
| DE | 102 59 702 A1 | 7/2003 |
| DE | 698 17 294 T2 | 6/2004 |
| DE | 103 92 766 T5 | 6/2005 |
| EP | 0 913 561 B1 | 10/1998 |
| EP | 1 405 995 A1 | 4/2004 |
| EP | 2 025 912 A1 | 2/2009 |
| FR | 2 892 770 B1 | 5/2007 |

* cited by examiner

*Primary Examiner* — Ching Chang
(74) *Attorney, Agent, or Firm* — Muncy, Geissler, Olds & Lowe, PLLC

(57) ABSTRACT

An exhaust gas recirculation system is provided that includes an internal combustion engine, which is supplied with exhaust gas, diverted at a removal point and returned via a return point and/or charge air, having a heat exchanger arranged between the removal point and the return point, for the returned exhaust gas and/or the charge air, and having an exhaust gas recirculation valve, by means of which the amount of returned exhaust gas and/or charge air can be regulated. To provide an exhaust gas recirculation system, which has a simple structure and can be manufactured cost-effectively, the exhaust gas recirculation valve is connectable between the removal point and the heat exchanger.

17 Claims, 2 Drawing Sheets

EXHAUST GAS RECIRCULATION SYSTEM

This nonprovisional application claims priority under 35 U.S.C. §119(a) to European Patent Application No. EP 09290726.0, which was filed on Sep. 25, 2009, and which is herein incorporated by reference.

BACKGROUND OF THE INVENTION

1. Field of the Invention

The invention relates to an exhaust gas recirculation system having an internal combustion engine, which is supplied with exhaust gas, diverted at a removal point and returned via a return point, and/or charge air, having a heat exchanger, arranged between the removal point and the return point, for the returned exhaust gas and/or the charge air, and having an exhaust gas recirculation valve, by means of which the amount of returned exhaust gas and/or charge air can be regulated.

2. Description of the Background Art

An exhaust gas recirculation line with a heat exchanger is known from the DE 698 17 294 T2 of the European Pat. App. No. EP 0 913 561 B1, which corresponds to U.S. Pat. No. 6,155,042, which is arranged between an engine and a catalyst container in series with restriction component for generating back pressure, whereby the heat exchanger flow is upstream of the restriction component. In the exhaust gas recirculation line, an exhaust gas recirculation valve is connected downstream of the heat exchanger. A throttle plate is connected parallel to the heat exchanger. An exhaust gas line for an internal combustion engine with a circulation line is known from the German patent publication No. DE 103 92 766 T5, which is connected directly or indirectly to an exhaust gas channel, for recycling a fraction of the exhaust gases. To cool the recycled fraction of the exhaust gases, a heat exchanger is connected between an exhaust gas catalyst container and a catalytic element. An exhaust gas system for a heat engine with a waste heat recovery region for recovering heat from the exhaust gas and transferring the recovered heat to a heating medium, which is arranged in the exhaust gas line, is known from the unexamined German Pat. App. No. DE 102 59 702 A1. To burn fuel, a burner, which is also called a combustor, is provided in the exhaust gas line.

SUMMARY OF THE INVENTION

It is therefore an object of the present invention to provide an exhaust gas recirculation system, which has a simple structure and can be manufactured cost-effectively.

The object in the case of an exhaust gas recirculation system having an internal combustion engine, which is supplied with exhaust gas, diverted at a removal point and returned via a return point, and/or charge air, having a heat exchanger, arranged between the removal point and the return point, for the returned exhaust gas and/or the charge air, and having an exhaust gas recirculation valve, by means of which the amount of returned exhaust gas and/or charge air can be regulated, is achieved in that the exhaust gas recirculation valve is connected between the removal point and the heat exchanger. All of the exhaust gas diverted at the removal point or all of the charge air diverted there is taken via the exhaust gas recirculation valve for heat exchange by the heat exchanger.

An exemplary embodiment of the exhaust gas recirculation system is characterized in that the heat exchanger is assigned a diverter valve through which the exhaust gas, diverted at the removal point and emerging from the heat exchanger, and/or the charge air are returned via the return point or removed via a branch line. The exhaust gas and/or the charge air diverted at the removal point, at least partially, together with the exhaust gas not diverted at the removal point can be discharged into the environment via the diverter valve by means of an exhaust system, which optionally comprises a catalytic device.

Another exemplary embodiment of the exhaust gas recirculation system is characterized in that the exhaust gas, diverted at the removal point and emerging from heat exchanger, and/or charge air are returned by the diverter valve totally or partially via the return point or discharged via the branch line. The heat exchanger can be used in one regard in a warm-up phase of the internal combustion engine to cool the exhaust gas diverted at the removal point for heat recovery. Moreover, the heat exchanger can be used to cool the exhaust gas returned to the return point to recover heat.

Another exemplary embodiment of the exhaust gas recirculation system is characterized in that the diverter valve is integrated into the heat exchanger. Alternatively or in addition, the exhaust gas recirculation valve can be integrated into the heat exchanger.

Another exemplary embodiment of the exhaust gas recirculation system is characterized in that the diverter valve is provided at the outlet of the heat exchanger. It is achieved thereby in a simple manner that all of the exhaust gas diverted at the removal point is first subjected to a heat exchange.

Another exemplary embodiment of the exhaust gas recirculation system is characterized in that the exhaust gas diverted at the removal point and/or the charge air can flow or do flow through the heat exchanger only in one direction. A heat exchanger of this type is also called an I-flow heat exchanger.

Another exemplary embodiment of the exhaust gas recirculation system is characterized in that the branch line and a return line are connected to one end of the heat exchanger. The other end of the two ends of the heat exchanger is preferably linked to the removal point for the exhaust gas and/or the charge air.

Another exemplary embodiment of the exhaust gas recirculation system is characterized in that the exhaust gas diverted at the removal point and/or the charge air can flow or do flow through the heat exchanger in opposite directions. A heat exchanger of this type is also called a U-flow heat exchanger.

Another exemplary embodiment of the exhaust gas recirculation system is characterized in that the branch line is connected to one end of the heat exchanger, which is linked to the removal point for the exhaust gas and/or the charge air. It is achieved thereby that the exhaust gas, diverted at the removal point and not returned to the return point, flows through the heat exchanger multiple times. The heat recovery can be improved further thereby.

Another exemplary embodiment of the exhaust gas recirculation system is characterized in that a return line is connected to the other end of the two ends of the heat exchanger. A filter can be arranged in the return line.

Another exemplary embodiment of the exhaust gas recirculation system is characterized in that a back pressure valve is connected downstream of the removal point. The back pressure valve is used to build up back pressure at the removal point. As a result, the temperature of the exhaust gas can be increased and the heat recovery improved.

Another exemplary embodiment of the exhaust gas recirculation system is characterized in that an additional removal point, which can be connected via another exhaust gas recirculation valve to another return point, which is provided between the return point and the internal combustion engine, is provided between the internal combustion engine and the removal point. An uncooled recirculation of the exhaust gas is made possible thereby in a simple manner.

Another exemplary embodiment of the exhaust gas recirculation system is characterized in that between the return point and the internal combustion engine a compressor for the exhaust gas and/or the charge air is provided, which is driven by a turbine, which is provided between the internal combustion engine and the removal point. The additional removal point is preferably provided between the internal combustion engine and the turbine. The additional return point is preferably provided between the compressor and the internal combustion engine.

Another exemplary embodiment of the exhaust gas recirculation system is characterized in that a charge air cooler is connected between the compressor and the internal combustion engine. The additional return point is preferably provided between the charge air cooler and the internal combustion engine.

Another exemplary embodiment of the exhaust gas recirculation system is characterized in that a diesel particle filter is connected downstream of the turbine. The diesel particle filter is preferably connected between the turbine and the removal point.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
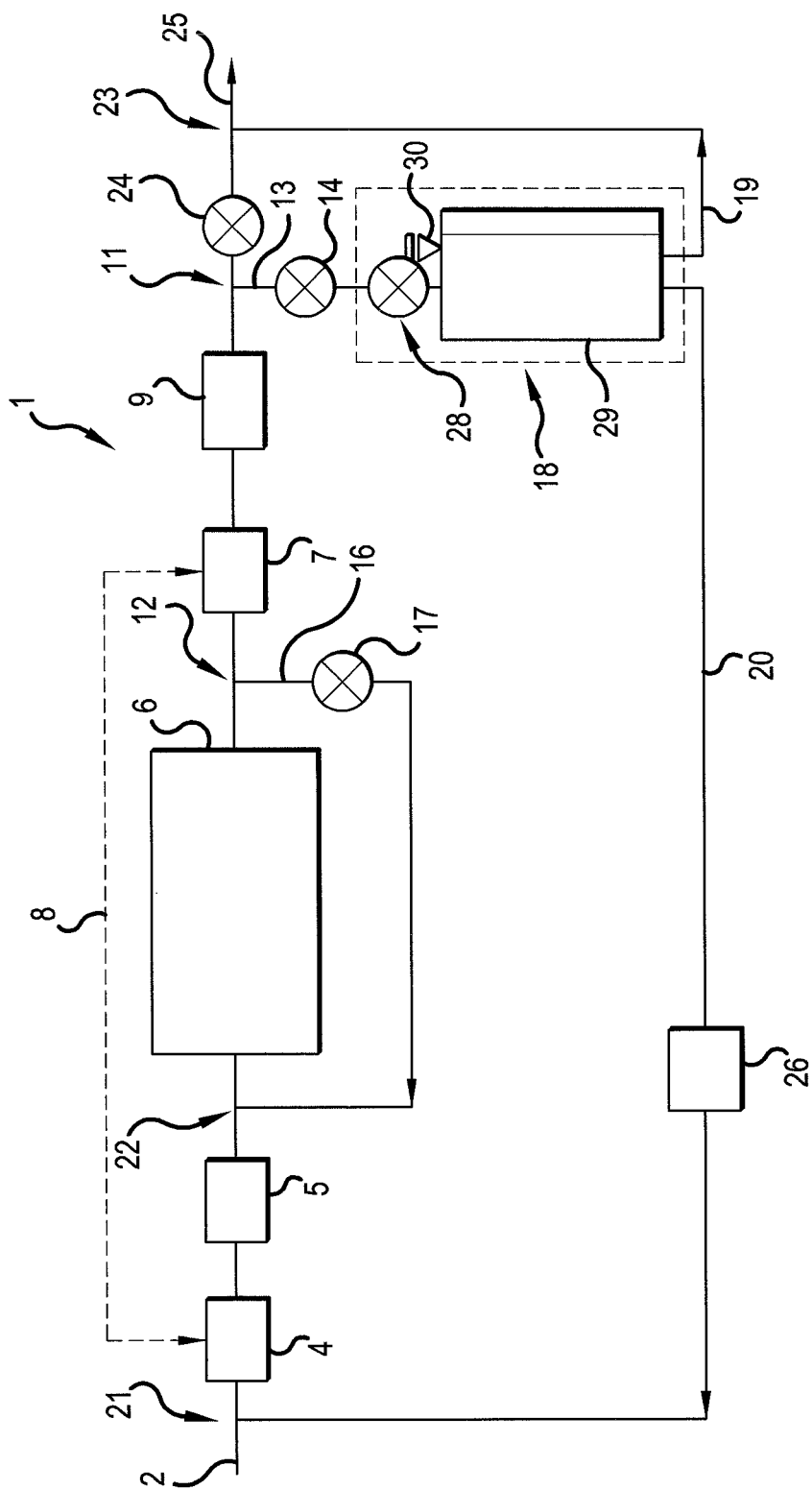
FIG. 1 shows a simplified illustration of an exhaust gas recirculation system of the invention with an internal combustion engine and a heat exchanger.

An exhaust gas recirculation system 1 in the form of a simplified fluid circuit diagram is shown in FIG. 1. A fluid, particularly air or a fuel/air mixture, is supplied in exhaust gas recirculation system 1 in a known manner at a point 2. The fluid is preferably supplied via a compressor 4 and optionally a charge air cooler 5 to an internal combustion engine 6, which is also called a combustion engine. A turbine 7, which is used, as indicated by a dashed double arrow 8, to drive compressor 4, is connected downstream of internal combustion engine 6. A diesel particle filter 9, for example, is connected downstream of turbine 7.

The performance of internal combustion engine 1 depends on the cubic capacity, rotational speed, and the average fluid pressure, particularly gas pressure. The filling of the combustion chambers can be improved considerably by charging of the internal combustion engine 6 and the engine performance increased thereby. The fluid or fuel/air mixture or the air is precompressed totally or partially outside the cylinder of the internal combustion engine. In an engine with an exhaust turbocharger, the exhaust gases drive the turbine and the turbine drives the compressor. The compressor takes over the intake and supplies the engine with a precompressed fresh gas charge. Charge air cooler 5 in the charge line dissipates the compression heat into the ambient air. As a result, the cylinder filling is improved further.

The exhaust gas released by the internal combustion engine is diverted at a first removal point 11 and a second removal point 12. The exhaust gas diverted at the first removal point 11 can be returned cooled via a first return line 13, in which a first exhaust gas recirculation valve 14 is arranged. The exhaust gas diverted at the second removal point 12 can be returned uncooled via a second return line 16, in which a second exhaust gas recirculation valve 17 is arranged.

For cooling the exhaust gas diverted at first removal point 11, a heat exchanger 18 is connected downstream of the first exhaust gas recirculation valve 14. The exhaust gas diverted at first removal point 11 and cooled in heat exchanger 18 can be supplied again to internal combustion engine 6 via a heat exchanger return line 20 and via a first return point 21. The exhaust gas diverted at second removal point 12 can be returned again uncooled to internal combustion engine 6 via the second exhaust gas recirculation valve 17 via a second return point 22.

First removal point 11 is connected between diesel particle filter 9 and a back pressure valve 24, which serves to build up back pressure when needed at first removal point 11. Second removal point 12 is arranged between internal combustion engine 6 and turbine 7. First return point 21 is arranged between point 2 and compressor 4. Second return point 22 is arranged between charge air cooler 5 and internal combustion engine 6. A third return point 23 is connected downstream of back pressure valve 24. An arrow 25 indicates that the exhaust gas of internal combustion engine 6 is supplied to a preferably sound-absorbing exhaust system, which can comprise a catalytic device.

The exhaust gas recirculation is used to cool the exhaust gas as much as possible. The returned exhaust gas no longer participates in the combustion in the internal combustion engine but heats up. Overall, the temperature in the internal combustion engine or the engine is reduced by the returned exhaust gas. The formation of nitrous oxides, which are highly dependent on the temperature in the engine, can be reduced by lower temperatures in the engine. A filter 26 can be arranged in the heat exchanger return line 20.

Heat exchanger 18 according to an essential aspect of the invention comprises a diverter valve 28, which is connected downstream of the first exhaust gas recirculation valve 14. Diverter valve 28 makes sure that both the exhaust gas diverted at first removal point 11 and returned via heat exchanger return line 20 and the exhaust gas diverted at first removal point 11 and diverted via a heat exchanger branch line 19 for the purpose of heat exchange first flows through a heat exchanger block 29 of heat exchanger 18, as indicated by an arrow 30.

Heat exchanger 18 can be operated in two different modes. In an exhaust gas recirculation cooling mode, heat exchanger 18 operates preferably as an I-flow heat exchanger, to lower the temperature of the gas flow of the returned exhaust gas. In a heat recovery mode, the gas flow diverted from the returned exhaust gas is used to heat the coolant passed through the heat exchanger, particularly in a warm-up phase of the internal combustion engine. Diverter valve 28 of the invention enables in a simple manner the illustration of the two modes with only one heat exchanger.

Figure 2:
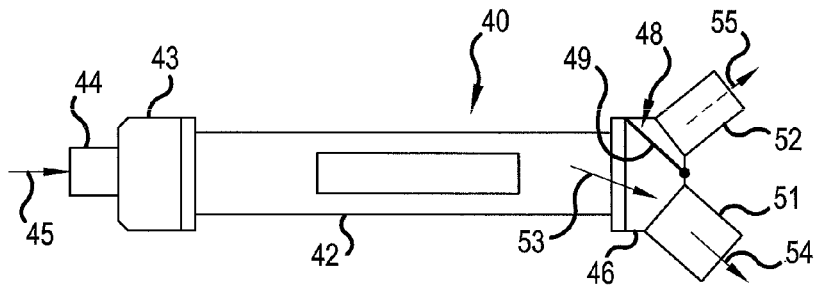
FIG. 2 shows the heat exchanger of FIG. 1 in an I-flow design in an exhaust gas recirculation mode.
Figure 3:
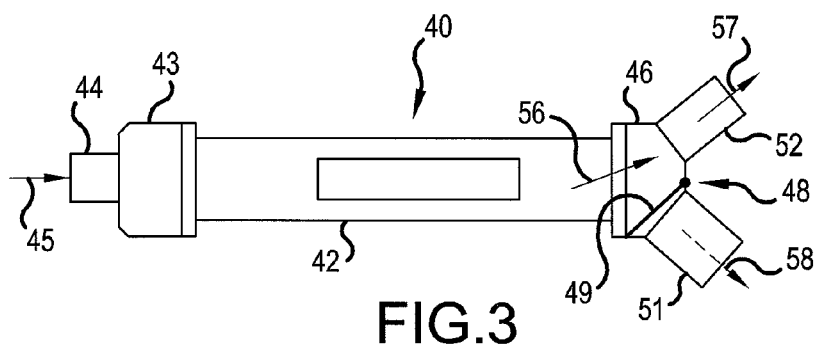
FIG. 3 shows the heat exchanger of FIG. 2 in a heat recovery mode.

It is shown in FIGS. 2 and 3 that heat exchanger 18 of FIG. 1 can be made as a one-way flow-through heat exchanger 40, which is also called an I-flow heat exchanger. Heat exchanger 40 comprises a one-way flow-through heat exchanger block 42 with a header box 43 at one end. Header box 43 has an inlet connection 44, through which, as indicated by an arrow 45, exhaust gas diverted at removal point 11 enters header box 43. At the other end of heat exchanger block 42, a header box 46 is provided into which a diverter valve 48 with a valve flap 49 is integrated. Header box 46 has two outlet connections 51, 52, through which the exhaust gas flow passed through heat exchanger block 42 emerges depending on the position of valve flap 49 of diverter valve 48.

In FIG. 2, valve flap 49 of diverter valve 48 blocks outlet connection 52, so that, as indicated by arrow 53 and 54, the entire volume flow passed through heat exchanger block 42 emerges from outlet connection 51, to which heat exchanger return line 20 is preferably connected. In the mode shown in FIG. 2, no gas emerges from outlet connection 52, as indicated by a dashed arrow 55. Heat exchanger branch line 19 is preferably connected to outlet connection 52. The first return line 13 is preferably connected to inlet connection 44.

In FIG. 3, valve flap 49 of diverter valve 48 is in its second extreme position in which, as indicated by arrows 56 and 57, all of the exhaust gas flow passed through heat exchanger block 42 emerges through outlet connection 52. A dashed arrow 58 indicates that in this position of valve flap 49, no exhaust gas emerges from outlet connection 51.

Figure 4:
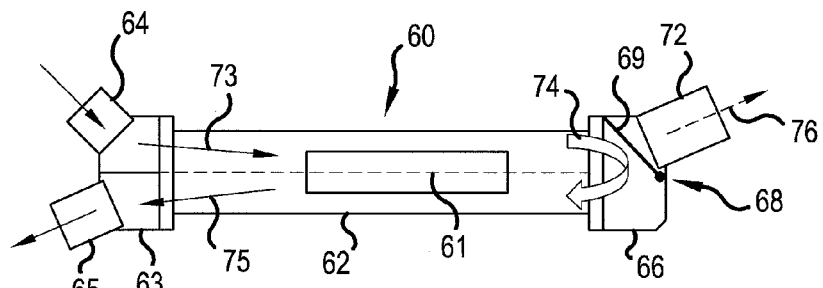
FIG. 4 shows the heat exchanger of FIG. 1 in a U-flow design in the heat recovery mode.
Figure 5:
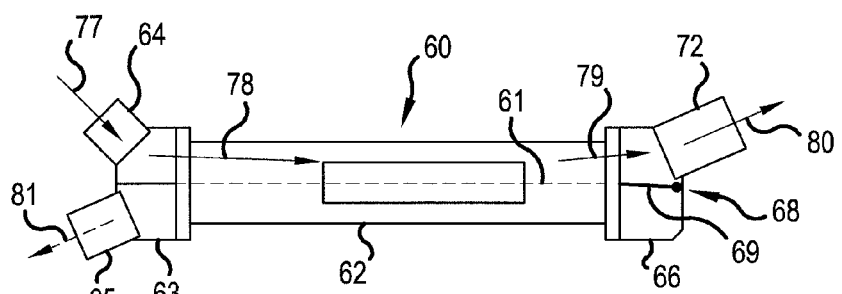
FIG. 5 shows the heat exchanger of FIG. 4 in the exhaust gas recirculation mode.

Shown in simplified form in FIGS. 4 and 5 is a heat exchanger 60 with at least one partition wall, which is indicated by a dashed line 61 and divides a heat exchanger block 62 so that it can be flown through in a U-shaped manner in opposite directions. Heat exchanger 60 at one end of heat exchanger block 62 comprises a header box 63 with an inlet connection 64 and an outlet connection 65, as indicated by arrows. At the other end of heat exchanger block 62, a header box 66 is provided, into which a diverter valve 68 with a valve flap 69 is integrated. Header box 66 comprises another outlet connection 72 through which, depending on the position of valve flap 69 of diverter valve 68, exhaust gas does or does not exit.

In FIG. 4, valve flap 69 of diverter valve 68 closes the additional outlet connection 72, so that, as indicated by arrows 73, 74, and 75, the flow passes through heat exchanger block 62 in a U-shaped manner. No exhaust gas exits through outlet connection 72, as indicated by a dashed arrow 76.

The first return line 13 is preferably connected to inlet connection 64. Heat exchanger branch line 19 is connected to outlet connection 65. Heat exchanger return line 20 is connected to the additional outlet connection 72.

In FIG. 5, valve flap 69 of diverter valve 68 is in a middle position in which the U-shaped flow, indicated in FIG. 4 of heat exchanger block 62, is interrupted. Arrows 77, 78, 79, and 80 in FIG. 5 indicate that the exhaust gas flow entering through inlet connection 64 flows one-way through heat exchanger block 62 in an I-shaped manner and again leaves completely through outlet connection 72. A dashed arrow 81 in FIG. 5 indicates that in this position of valve flap 69 of diverter valve 68, no exhaust gas emerges from outlet connection 65.

Of course, in addition to the extreme positions shown in FIGS. 2 to 5 of valve flap 49; 69 of diverter valve 48; 68, intermediate positions are possible in which in each case only a fraction of the exhaust gas flow supplied through the first return line 13 reaches the heat exchanger return line 20 or heat exchanger branch line 19.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An exhaust gas recirculation system comprising:
   an internal combustion engine that is configured to be supplied with exhaust gas and/or charge air diverted at a removal point and returned via a return point;
   a heat exchanger arranged between the removal point and the return point for the returned exhaust gas and/or the charge air; and
   an exhaust gas recirculation valve via which the amount of returned exhaust gas and/or charge air is regulated,
   wherein the exhaust gas recirculation valve is connectable between the removal point and the heat exchanger, and
   wherein an additional removal point, which is connectable via another exhaust gas recirculation valve to an additional return point, which is provided between the return point and the internal combustion engine, is arranged between the internal combustion engine and the removal point.

2. The exhaust gas recirculation system according to claim 1, wherein the heat exchanger is assigned a diverter valve through which the exhaust gas and/or the charge air diverted at the removal point and emerging from the heat exchanger are returned via the return point or removed via a branch line.

3. The exhaust gas recirculation system according to claim 2, wherein the exhaust gas and/or charge air diverted at the removal point and emerging from heat exchanger are returned by the diverter valve totally or partially via the return point or discharged via the branch line.

4. The exhaust gas recirculation system according to claim 2, wherein the diverter valve is integrated into the heat exchanger.

5. The exhaust gas recirculation system according to claim 2, wherein the diverter valve is arranged at an outlet of the heat exchanger.

6. The exhaust gas recirculation system according to claim 2, wherein the exhaust gas and/or the charge air diverted at the removal point is configured to flow through the heat exchanger only in one direction.

7. The exhaust gas recirculation system according to claim 6, wherein the branch line and a return line are connectable to one end of the heat exchanger.

8. The exhaust gas recirculation system according to claim 2, wherein the exhaust gas and/or the charge air diverted at the removal point is configured to flow through the heat exchanger in opposite directions.

9. The exhaust gas recirculation system according to claim 8, wherein the branch line is connected to one end of the heat exchanger, which is linked to the removal point for the exhaust gas and/or the charge air.

10. The exhaust gas recirculation system according to claim 9, wherein a return line is connectable to an other end of two ends of the heat exchanger.

11. The exhaust gas recirculation system according to claim 1, wherein a back pressure valve is connectable downstream of the removal point.

12. The exhaust gas recirculation system according to claim 1, wherein between the return point and the internal combustion engine, a compressor for the exhaust gas and/or the charge air is provided, which is driven by a turbine that is arranged between the internal combustion engine and the removal point.

13. The exhaust gas recirculation system according to claim 12, wherein a charge air cooler is connectable between the compressor and the internal combustion engine.

14. The exhaust gas recirculation system according to claim 12, wherein a diesel particle filter is connectable downstream of the turbine.

15. The exhaust gas recirculation system according to claim 1, wherein uncooled exhaust gas and/or charge air is returned to the internal combustion engine by the additional return point.

16. An exhaust gas recirculation system comprising:
   an internal combustion engine that is configured to be supplied with exhaust gas and/or charge air diverted at a first removal point and returned via a first return point;
   a heat exchanger arranged between the first removal point and the first return point for the returned exhaust gas and/or the charge air;
   an exhaust gas recirculation valve connected between the first removal point and the first heat exchanger; and
   a second exhaust gas recirculation valve connected between a second removal point and a second return point, the second removal point arranged between the internal combustion engine and the first removal point and the second return point arranged between the first return point and the internal combustion engine.

17. The exhaust gas recirculation system according to claim 16, wherein uncooled exhaust gas and/or charge air is returned to the internal combustion engine by the second return point.

* * * * *